Patented July 25, 1950

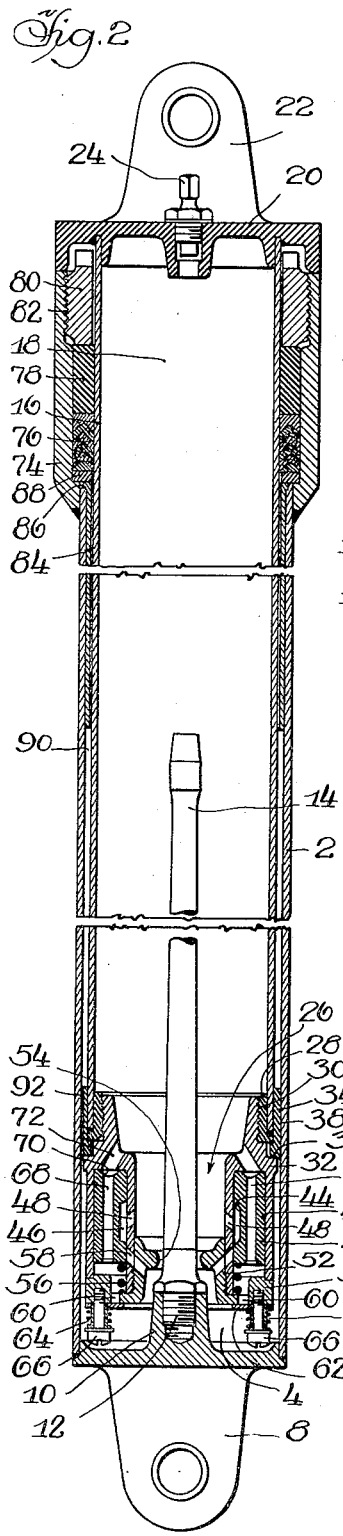
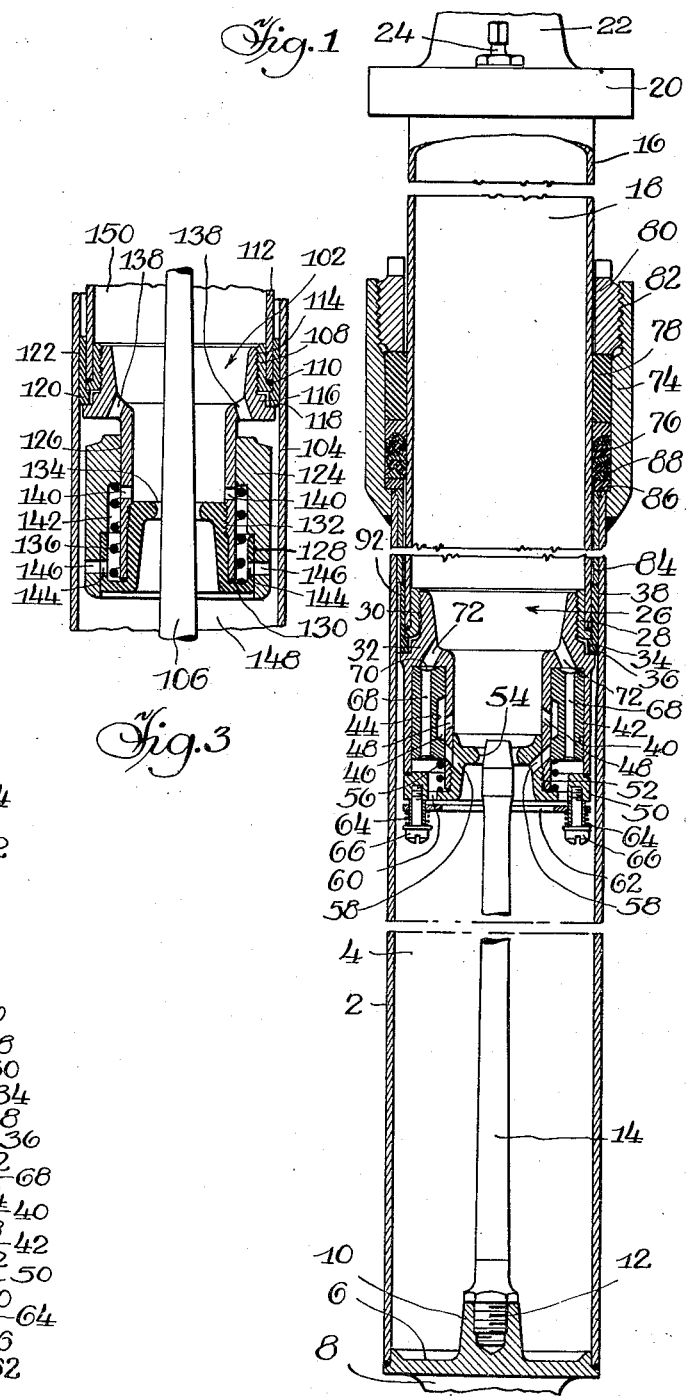

2,516,667

UNITED STATES PATENT OFFICE 2,516,667

SHOCK STRUT

Fred E. Bachman, Chicago, Ill., assignor to American Steel Foundries, Chicago, Ill., a corporation of New Jersey Application May 26, 1944, Serial No. 537,479

20 Claims. (Cl. 267—64)

My invention relates to shock absorbers and more particularly to an hydraulic device commonly termed an oleo strut and utilized in the connection between the fuselage and landing gear of an aircraft.

The primary object of my invention is to design a novel oleo strut of the type in which a hollow piston reciprocates within a cylinder carrying a metering pin which in turn reciprocates within a passage through the piston head communicating with an internal chamber therewithin, the metering pin being of tapered cross-sectional area to define with said passage an orifice of gradually decreasing cross-sectional area through which hydraulic fluid within the device is metered on the closure stroke thereof.

In my novel strut, inertia by-pass valve means is provided for accommodating flow of hydraulic medium from the high pressure cylinder chamber to the low pressure piston chamber independently of the orifice defined by the metering pin and the piston head passage, whereby the hydraulic medium within the device may by-pass said orifice under conditions wherein the strut is urged suddenly upward as the aircraft to which it is attached passes over an irregularity in the terrain or water.

Another object of my invention is to design a novel strut such as above described in which means is provided for by-passing the metering orifice on the extension stroke of the device, thus affording rapid release thereof.

A different object of my invention is to provide a novel dashpot construction for dampening the extension stroke of the device.

In the drawings:

Figure 1 is a sectional view through a novel expanded aleo strut embodying my invention, portions of the device being shown in elevation.

Figure 2 is a sectional view comparable to Figure 1, but illustrating the strut at the end of its closure stroke.

Figure 3 is a fragmentary sectional view illustrating a modification of my invention wherein the inertia by-pass valve means is in the open position thereof.

Describing my invention in detail and referring first to the embodiment thereof illustrated in Figures 1 and 2, the strut comprises a bottom follower in the form of a cylinder 2 comprising a high pressure chamber 4 and a closure member 6 at the lower extremity thereof comprising a bracket 8 for convenient connection to the landing gear (not shown) of an associated aircraft, said member 6 also including the upstanding hollow boss 10 which is internally threaded for convenient connection to the threaded end 12 of the metering pin generally designated 14.

It may be noted that the metering pin is tapered in cross-sectional area from the lower extremity thereof; however, it will be understood by those skilled in the art that if desired, the pin may be of uniform cross-sectional area throughout its length.

The strut also comprises a top follower in the form of a hollow piston 16 including an internal low pressure chamber 18 closed at its upper extremity by the closure member 20 which is provided with a bracket 22 for convenient connection to the fuselage (not shown) of the associated aircraft. The closure member 20 is provided with a fitting 24 by means of which compressed air may be admitted to the upper extremity of the low pressure chamber 18 to afford an air spring operable to resist the closure stroke of the device and to return the piston to its normal extended position at the end of said closure stroke, as will be clearly understood by those skilled in the art.

The lower extremity of the piston 16 is formed with a piston head generally designated 26 and hereinafter described in detail. The piston head includes a collar 28 welded to the lower end of the piston 16 and having a threaded connection at 30 to a hollow sleeve 32 forming an extension on the lower end of the head. The sleeve 32 bears against the lower end of a collar 34 which has shouldered engagement at 36 with the collar 28 and slidable engagement at 38 with the cylinder 2.

The sleeve 32 comprises an annular valve chamber 40 within which is slidably fitted an annular inertia valve member 42 with an annular groove or recess 44 in its inner perimeter defining with the sleeve 32 an annular chamber 46 communicating with the low pressure chamber 18 through one or more ports 48, 48 in the sleeve 32. The lower end of the valve chamber 40 is closed by an annular cap 50 in threaded engagement at 52 with the sleeve 32, said cap having a central restricted passage 54 defining with the metering pin 14 an orifice through which hydraulic fluid is metered from the high pressure chamber 4 to the low pressure chamber 18 on the closure stroke of the strut. It will be understood that as the piston 16 moves downwardly on its closure stroke, the orifice defined by the passage 54 and the pin 14 gradually decreases in cross-sectional area because of the tapered form of the metering pin 14, thus gradually increasing the resistance of the strut to the closure stroke thereof.

The valve member 42 is resiliently urged to its closed position, as seen in Figure 1, by a spring 56 which is formed and arranged to yield at a predetermined pressure in response to sudden upward movement of the strut as the landing gear (not shown) attached to the bracket 8 passes over an irregularity in the terrain. The cap 50 and the sleeve 32 have aligned openings defining one or more ports 58, 58 which communicate with the annular chamber 46 in the open position of the valve member to permit hydraulic fluid within the device to by-pass the passage 54 and to flow from the high pressure chamber 4 to the low pressure chamber 18 through the annular chamber 46, thus facilitating closure of the strut under conditions wherein an unusual impact causes the strut to move suddenly upward, as above described, the inertia of the valve member 42, under these conditions, causing it to assume its open position with the annular chamber 46 in communication with the ports 58, 58.

It may be noted that in the closed position of the valve 42 high pressure fluid within the high pressure chamber 4 acts on the valve 42 through the ports 58 along balanced surfaces of the valve 42 extending approximately axially of the strut, as best seen in Figures 1 and 2, and in the open position of valve 42 with the ports 58 connected to the chamber 46 high pressure fluid admitted from the high pressure chamber 4 to the annular chamber 46 also acts against balanced surfaces of the valve 42, whereby high pressure fluid in the chamber 4 is at all times balanced against the valve 42 so that its movement to open and closed position is entirely unaffected by the fluid in the chamber 4. It will be understood by those skilled in the art that this feature is extremely important inasmuch as high pressure in the chamber 4 acting against unbalanced areas of the valve 42 would prevent proper functioning thereof.

The cap 50 is provided with a plurality of ports or passages 60, 60 affording communication between the high pressure chamber 4 and the annular chamber 40 within the sleeve 32, said ports 60, 60 being closed on the compression or closure stroke of the device by means of a flapper valve mechanism including an annular flapper plate 62 resiliently urged to its closed position by springs 64, 64 mounted on stud bolts 66, 66 carried by the cap 50. The valve member 42 is provided with one or more vertical passages 68, 68 therethrough communicating with an annular groove 70 in the upper extremity thereof, said groove 70 being adapted to register with one or more ports or passages 72, 72 through the sleeve 32 adjacent its upper extremity, said ports 72, 72 communicating with the low pressure chamber 18 within the piston.

It will be understood that on the closure stroke of the device, the springs 64, 64, in combination with the relatively high hydraulic pressure within the chamber 4, urges the plate 62 to its closed position over the ports 60, 60 (Figure 1), thereby causing the hydraulic medium within the strut to be metered from the chamber 4 into the low pressure chamber 18 through the passage 54 except under conditions such as above described wherein the strut is subjected to a sudden upward movement, causing the valve member 42 to assume its open position by reason of its inertia, whereupon the hydraulic medium is enabled to by-pass the passage 54, as above described.

On the extension stroke of the device, the relatively high pressure within the chamber 40 causes the flapper plate 64 to move to its open position against the resistance of the springs 64, 64, as seen in Figure 1, whereupon the hydraulic medium is enabled to by-pass the passage 54 by flowing through the ports 72, 72 and the passages 68, 68, as well as the ports 60, 60, into the high pressure chamber 4. By means of this arrangement, rapid release or extension of the strut is facilitated, as is desirable under service conditions.

The cylinder 2 is provided at its upper extremity with a collar 74 within which is received a conventional packing gland 76 and a bearing 78 of brass or other suitable material, said bearing and gland being maintained in assembled relationship by means of a nut 80 in threaded engagement at 82 with the collar 74.

A sleeve 84 is snugly fitted within the cylinder 2 in shouldered engagement at 86 therewith, said sleeve being maintained in assembled relationship by means of a ring 88 positioned between the packing gland 76 and the upper extremity of the sleeve 84. It may be noted, as seen in Figure 2, that the piston 16 and the cylinder 2 are spaced from each other to define an annular dashpot chamber 90 within which hydraulic fluid is entrapped on the extension stroke of the device, thus dampening said stroke. The entrapped fluid is gradually forced from the annular chamber 90 through one or more grooves 92, 92 by the sleeve 84 as the piston 16 moves upwardly relative to the cylinder 2 on the extension stroke of the device. This, in effect, causes a metering of the fluid within the chamber 90 through the grooves 92, 92 which softens or dampens the release stroke of the strut for the purpose of preventing damage to the various parts thereof which might result from a too rapid extension of the device.

Referring now to Figure 3 which illustrates a modification of my invention substanially identical with that shown in Figures 1 and 2, except for the construction of the piston head generally designated 102 which reciprocates within the cylinder 104 carrying a metering pin 106, as in the previously described embodiment, the piston head 102 comprises a collar 108 secured as by welding at 110 to the lower end of the piston 112 and having threaded engagement at 114 with a sleeve 116. The sleeve 116 is in shouldered engagement at 118 with a collar 120 which slidably engages the cylinder as at 122 to afford a substantially fluid-tight fit therewith.

An annular valve member 124 is slidably fitted over the sleeve 116 in slidable engagement with the radially inner wall thereof as at 126 and in slidable engagement at 128 with a radially outer wall defined by an annular cap 130 threaded at 132 within the sleeve 116, said cap comprising a passage 134 within which the metering pin 106 reciprocates to define an orifice therewith. A spring 136 is seated against the cap and against the valve member 124 for urging the latter into its closed position over the ports 138, 138 through the sleeve 116 adjacent the upper extremity thereof. The sleeve is also provided with ports 140, 140 communicating with an annular chamber 142 defined by the sleeve, the valve member 124 and the cap 130; and the cap and valve member are formed respectively with ports 144 and 146 which are adapted to register with each other in the open position of the valve member 124, as illustrated in Figure 3.

It will be understood that when the valve member 124 is in its open position as the result of sudden upward movement of the strut under conditions heretofore described for the previous embodiment, hydraulic fluid within the high pressure chamber 148 of the cylinder is permitted to by-pass the passage 134 through the annular chamber 142 and also through the ports 138, 138, thus facilitating the closure stroke of the strut under these conditions.

It will also be apparent that on the extension stroke of the strut, wherein the pressure within the low pressure piston chamber 150 is greater than that within the high pressure chamber 148, the hydraulic medium within the strut acting through the ports 138, 138 is operable to urge the valve member 124 to its open position, thereby permitting the hydraulic medium to by-pass the passage 134 through the ports 138, 138 and through the annular chamber 142. Thus, it will be understood that in the modification of Figure 3, the valve member 124 serves a double function in acting not only as an inertia valve during sudden upward movement of the strut, but also in acting as by-pass valve on the release or extension stroke of the strut.

As in the previously described embodiment of the invention, the pressure areas at the top and bottom of valve 124 and on the inner perimeter thereof, are equalized so that opening and closing of the valve member as above described are entirely unaffected by the pressures in the high pressure chamber.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In an oleo strut, a bottom follower in the form of a cylinder with a high pressure chamber and a metering pin mounted therein, a top follower in the form of a hollow piston comprising an internal low pressure chamber and a head reciprocal within said cylinder, said head comprising a sleeve member with an annular valve chamber, a central restricted passage through said member within which said pin reciprocates to define an orifice therewith affording communication between said chambers, ports communicating with said high pressure chamber and the lower extremity of said valve chamber, an annular valve member slidingly fitted within said valve chamber, a recess in the inner perimeter of said valve member defining with said sleeve an annular chamber communicating at all times with said low pressure chamber through a port in said sleeve member above said orifice, a port through said sleeve member below said orifice, said valve member being adapted in its open position to register with said last-mentioned port, resilient means carried by said sleeve member and abutting a downwardly facing surface on said valve member for urging the latter toward its closed position, said spring means being formed and arranged to yield due to the inertia of said valve member during sudden upward movement of said strut, thereby accommodating movement of said valve member relative to said sleeve to said open position, a passage through said sleeve member adjacent its upper extremity adapted to register with a substantially vertical passage through said valve member, a flapper plate carried by the lower end of said sleeve member, resilient means for urging said flapper plate toward its closed position over said first-mentioned ports, and a spring in the form of a body of compressed gas within the upper extremity of said low pressure chamber, said spring being operable to yieldingly resist the closure stroke of the strut.

2. In an oleo strut, a bottom follower in the form of a cylinder with a high pressure chamber and a metering pin mounted therein, a top follower in the form of a hollow piston comprising an internal low pressure chamber and a head slidably fitted in said cylinder for reciprocation therewithin, said head comprising a sleeve member with an annular valve chamber, a central restricted passage through said member within which said pin reciprocates to define an orifice therewith affording communication between said chambers, ports communicating with said high pressure chamber and the lower extremity of said valve chamber, an annular valve member slidably fitted within said valve chamber, a recess in the inner perimeter of said valve member defining with said sleeve an annular chamber communicating at all times with said low pressure chamber through a port in said sleeve member above said orifice, a port through said sleeve member below said orifice, said valve member being adapted in its open position to register with said last-mentioned port, spring means for urging said valve member toward its closed position, said spring means being formed and arranged to yield due to the inertia of said valve member during sudden upward movement of said strut, thereby accommodating movement of said valve member relative to said sleeve to said open position, a passage through said sleeve member adjacent its upper extremity adapted to register with a substantially vertical passage through said valve member, a flapper plate carried by the lower end of said sleeve member, and resilient means for urging said flapper plate toward its closed position over said first-mentioned ports.

3. In an hydraulic shock absorber device, a bottom follower in the form of a cylinder with a high pressure chamber therein, a metering pin carried by said follower within said chamber, a top follower in the form of a hollow piston having an internal low pressure chamber and a piston head reciprocal within said cylinder, an extension depending from said head, said extension comprising a passage therethrough with a restricted portion adapted to accommodate fluid communication between said chambers, said pin being reciprocal within said restricted portion of said passage and defining therewith a metering orifice, an annular valve member slidably fitted over said extension and defining therewith an annular chamber communicating with said low pressure chamber through an opening in said extension disposed above said restricted portion, said annular chamber being adapted to register with an opening in said extension below said restricted portion only when said valve member is in its open position, spring means carried by said extension and bearing against a downwardly facing surface on said valve member for urging the latter toward its closed position, said spring means being formed and arranged to yield and thereby permit said valve member to assume its open position, as said device is subjected to a sudden upward movement of predetermined magnitude, and resilient means characterized by a compressed gas spring in the upper extremity of said low pressure chamber, said gas spring being operable to yieldingly resist the closure stroke of the device.

4. In an hydraulic shock absorber device, a bottom follower in the form of a cylinder carrying a metering pin tapering toward its upper extremity, a top follower in the form of a hollow piston having a head slidably reciprocal within said cylinder, a passage through said head affording fluid commuciation between said cylinder and the interior of said piston, said pin being reciprocal within said passage and defining therewith an orifice through which fluid medium within said device is metered on the closure stroke thereof, inertia by-pass valve means for accommodating flow of said medium from said cylinder into the interior of said piston and independently of said orifice during a sudden upward movement of said device, and an air spring within said piston compressible by the fluid within said device for yieldingly resisting the closure stroke thereof, said valve means comprising an annular valve member slidably sleeved over a downwardly projecting extension of said head and defining with said extension an annular chamber, a port through said extension above said passage and connecting said chamber at all times to the interior of said piston, and a port through said extension below said passage and formed and arranged to open said chamber to communication with said cylinder when said valve member is in its open position, and spring means carried by said extension and reacting against a downwardly facing surface on said member for urging it upwardly toward its closed position.

5. In an oleo strut, top and bottom followers, one of said followers being in the form of a cylinder comprising a high pressure chamber, a metering pin carried by said cylinder within said chamber, the other of said followers being in the form of a piston with a head reciprocal within said cylinder, a passage through said head affording fluid communication between said chamber and a low pressure chamber within said piston, said pin being reciprocal within said passage and defining therewith a metering orifice, and inertia by-pass valve means independent of said orifice for accommodating flow of fluid from said high pressure chamber to said low pressure chamber during a sudden upward movement of said strut, said by-pass valve means comprising an annular valve member slidably sleeved over a portion of said head and defining with said portion an annular chamber, passage means connecting said annular chamber at all times to said low pressure chamber, and passage means for opening said high pressure chamber to communication with said annular chamber only when said valve member is in its open position, and yielding means for urging said valve member toward its closed position, said yielding means being formed and arranged to permit said head to move upwardly relative to said valve member because of the inertia of the latter during a sudden upward movement of said strut, whereby said valve member assumes its open position.

6. In an hydraulic shock absorber device, a bottom follower in the form of a cylinder with a high pressure chamber, a metering pin carried by said follower within said chamber, said pin tapering toward its upper extremity, a top follower in the form of a hollow piston having an internal low pressure chamber and a piston head slidably fitted within said cylinder for reciprocation therewithin, an extension on said head comprising a passage therethrough with a restricted portion affording fluid communication between said chambers, said pin being reciprocal within said restricted portion and defining therewith an orifice, an annular valve member slidably sleeved over said extension and defining therewith an annular chamber communicating at all times with said low pressure chamber through an opening in said extension disposed above said restricted portion, said annular chamber being adapted to register with an opening in said extension below said restricted portion in the open position only of said valve member, spring means for urging said valve member to its closed position, said spring means being formed and arranged to yield and thereby permit said valve member to assume its open position as said device is subjected to sudden upward movement, and an air spring in the upper extremity of said low pressure chamber copressible by the hydraulic fluid medium within said device on the closure stroke thereof.

7. In an hydraulic shock absorber device, a bottom follower in the form of a cylinder with a high pressure chamber therein, a metering pin carried by said follower within said chamber, a top follower in the form of a hollow piston having an internal low pressure chamber and a piston head reciprocal within said cylinder, an extension depending from said head, said extension comprising a passage therethrough with a restricted portion adapted to accommodate fluid communication between said chambers, said pin being reciprocal within said restricted portion of said passage and defining therewith a metering orifice, an annular valve member slidably fitted over said extension and defining therewith an annular chamber communicating with said low pressure chamber through an opening in said extension disposed above said restricted portion, said annular chamber being adapted to register with an opening in said extension below said restricted portion only when said valve member is in its open position, and spring means carried by said extension and bearing against a downwardly facing surface on said valve member for urging the latter toward its closed position, said spring means being formed and arranged to yield and thereby permit said valve member to assume its open position, as said device is subjected to a sudden upward movement of predetermined magnitude.

8. In an hydraulic shock absorber device, a bottom follower in the form of a cylinder with a high pressure chamber, a metering pin carried by said follower within said chamber, said pin tapering toward its upper extremity, a top follower in the form of a hollow piston having an internal low pressure chamber and a piston head slidably fitted within said cylinder for reciprocation therewithin, an extension on said head comprising a passage therethrough with a restricted portion affording fluid communication between said chambers, said pin being reciprocal within said restricted portion and defining therewith an orifice, an annular valve member slidably sleeved over said extension and defining therewith an annular chamber communicating at all times with said low pressure chamber through an opening in said extension disposed above said restricted portion, said annular chamber being adapted to register with an opening in said extension below said restricted portion in the open position only of said valve member, and spring means for urging said valve member to its closed position, said spring means being formed and arranged to yield and thereby accommodate relative movement of said valve member to its open position as said device is subjected to sudden upward movement.

9. In an hydraulic shock absorber device, a bottom follower in the form of a cylinder carrying a metering pin, a top follower in the form of a hollow piston having a head slidably reciprocal within said cylinder, a passage through said head affording fluid communication between said cylinder and the interior of said piston, said pin being reciprocal within said passage and defining therewith an orifice through which fluid medium within said device is metered on the closure stroke thereof, and inertia by-pass valve means for accommodating flow of said medium from said cylinder into the interior of said piston and independently of said orifice during a sudden upward movement of said device, said valve means comprising an annular valve member slidably sleeved over a portion of said head and defining therewith an annular chamber, a port above said orifice connecting said chamber at all times to the interior of said piston, and a port through said portion beneath said orifice adapted to open said chamber to communication with said cylinder when said valve member is in its open position, and spring means carried by said portion and reacting against a downwardly facing surface on said member for urging it upwardly toward its closed position.

10. In an oleo strut, a bottom follower in the form of a cylinder with a high pressure chamber and a metering pin mounted therein, a top follower in the form of a hollow piston comprising an internal low pressure chamber and a piston head slidably fitted in said cylinder for reciprocation therewithin, said head comprising a structure depending therefrom and including radially inner and outer walls and a central passage within which said metering pin reciprocates, a valve member slidably fitted on said inner and outer walls and defining therewith an annular chamber, a port through said inner wall communicating at all times with said annular chamber and with said low pressure chamber, a port through said outer wall closed by said valve member in the closed position thereof, a port through said valve member communicating at all times with said high pressure chamber and adapted to communicate with said annular chamber in the open position only of said valve member, spring means for urging said valve member upwardly toward its closed position, said spring means being formed and arranged to yield under the inertia load of said valve member to permit the same to assume its open position during a sudden upward movement of said strut, and at least one port through said head accommodating hydraulic pressure against the upper end of said valve member for urging the latter to its open position whenever the pressure within said low pressure chamber exceeds that within said high pressure chamber.

11. In a oleo strut, a bottom follower in the form of a cylinder with a high pressure chamber and a metering pin mounted therein, a top follower in the form of a hollow piston comprising an internal low pressure chamber and a piston head slidably fitted in said cylinder for reciprocation therewithin, said head comprising a structure depending therefrom and including radially inner and outer walls and a central passage within which said metering pin reciprocates, a valve member slidably fitted on said inner and outer walls and defining therewith an annular chamber, a port through said inner wall communicating at all times with said annular chamber and with said low pressure chamber, a port through said outer wall closed by said valve member in the closed position thereof, a port through said valve member communicating at all times with said high pressure chamber and adapted to communicate with said second-mentioned port in the open position only of said valve member, and spring means for urging said valve member upwardly toward its closed position, said spring means being formed and arranged to yield under the inertia load of said valve member during a sudden upward movement of said strut.

12. In a shock strut, a bottom follower in the form of a cylinder with a high pressure chamber therein, a top follower in the form of a hollow piston with an internal low pressure chamber, a head on said piston reciprocal within said high pressure chamber and comprising a central passage affording communication between said chambers, a metering pin mounted within said cylinder and adapted for reciprocation within said passage to define a restricted orifice therewith, passage means through said head adapted to afford communication between said chambers independently of said orifice, and inertia valve means including a valve member adapted in the closed position thereof to close said passage means along a surface of the head extending approximately axially of the strut, the surfaces of said valve member exposed to the fluid in said passage means being balanced at all times, said valve member being adapted in the open position thereof to open said passage means, and spring means for urging said valve member to the closed position thereof, said spring means being adapted to yield and thereby permit said valve member to assume its open position as said strut is subjected to a sudden upward movement of predetermined magnitude.

13. In an hydraulic shock absorber device, a cylinder, a metering pin carried therewithin, a hollow piston comprising a head reciprocal within said cylinder, said pin being reciprocal within a restricted passage through said head, and defining an orifice with said passage, a valve member slidably engaged with a portion of said head and carried thereby, said valve member defining with said portion an annular chamber communicating at all times with the interior of said piston through a port in said portion inwardly of the orifice, said valve member being adapted in its open position to afford fluid communication between said annular chamber and said cylinder through another port in said portion, disposed outwardly of said passage, and spring means carried by the piston for urging said valve member to its closed position, said spring means being formed and arranged to yield due to the inertia of said valve member during a sudden movement of the device axially thereof and of a predetermined magnitude, whereby the valve member may move to open position against the resistance of said spring means.

14. In an hydraulic shock absorber device, a cylinder, a hollow piston comprising a head reciprocal within said cylinder, said head having a restricted metering passage connecting the cylinder to the interior of the piston, a valve member slidably engaged with a portion of the head and carried thereby, said valve member defining with said portion an annular chamber communicating at all times with the interior of the piston through a port in said portion inwardly of said passage, said valve member being adapted in its open position to afford fluid communication between said annular chamber and said cylinder through another port in said portion disposed outwardly of said passage, and spring means for urging said valve member to its closed position, said spring means being carried by the piston and being formed and arranged to yield due to the inertia of said valve member during a sudden movement of the device axially thereof and of a predetermined magnitude.

15. An hydraulic shock absorber comprising a cylinder adapted to contain hydraulic fluid, a hollow piston containing an internal low pressure chamber, said piston having a head member reciprocal in the cylinder and defining therewith a high pressure chamber in the cylinder, an opening through said head member connecting said chambers, a metering pin carried by the cylinder and extendable through said opening to defining a metering orifice therein, a valve member carried by said member and defining therewith a by-pass chamber communicating at all times through a port in one member with the low pressure chamber at a point inwardly of the orifice, said valve member being adapted in open position to afford fluid communication between the by-pass chamber and the high pressure chamber through another port in said one member outwardly of the orifice and being adapted in closed position to prevent flow of fluid through the last mentioned port, and spring means carried by the piston for urging the valve member to its closed position, said spring means being formed and arranged to yield due to the inertia of said valve member during a sudden movement of the shock absorber axially of the cylinder thereof and of a predetermined magnitude.

16. In an hydraulic shock absorber device, a cylinder, a metering pin carried therewithin, a hollow piston comprising a head reciprocal within said cylinder, said pin being reciprocal within a restricted passage through said head and defining an orifice with said passage, a valve member slidably fitted over a portion of said head and defining with said portion an annular chamber communicating at all times with the interior of said piston through a port in said portion inwardly of said orifice, said valve member being adapted in its open position to afford fluid communication between said annular chamber and said cylinder through another port in said portion disposed outwardly of said passage, and spring means for urging said valve member to its closed position, said spring means being formed and arranged to yield due to the inertia of said valve member during a sudden movement of the device axially thereof and of a predetermined magnitude.

17. In a shock strut, a pair of telescoping followers defining axially spaced high and low pressure chambers in respective followers, a metering orifice through one of the followers interconnecting said chambers, passage means through said one follower adapted to afford communication between said chambers independently of said orifice, inertia valve means carried by said one follower including a valve member adapted in the closed position thereof to close said passage means, said valve member being adapted in the open position thereof to open said passage means, and spring means for urging said valve member to the closed position thereof, said spring means being adapted to yield and thereby permit said valve member to assume its open position as said strut is subjected to sudden movement in one direction axially thereof, said valve member having balanced pressure areas acted on at all times by the pressure in said high pressure chamber.

18. An hydraulic shock absorber comprising a cylinder adapted to contain hydraulic fluid, a hollow piston carrying a structure reciprocal within said cylinder and defining a high pressure chamber therein at one side of said structure, said piston having an internal low pressure chamber at the other side of such structure, said structure including a head member having a passage connecting said chambers and including a valve member carried by the head member and defining therewith a by-pass chamber connected at all times to the low pressure chamber through a port in one of the members inwardly of said passage, said valve member being movable relative to the head member to open position and being adapted in open position to connect the high pressure chamber to the by-pass chamber through another port in one of the members outwardly of said passage, and spring means carried by said structure for urging the valve member to closed position, whereat the last mentioned port is closed with respect to the high pressure chamber, said spring means being formed and arranged to yield due to inertia of the valve member during a sudden movement of the shock absorber axially of the piston and cylinder thereof and of a predetermined magnitude.

19. In a shock strut, a bottom follower in the form of a cylinder with a high pressure chamber therein, a top follower in the form of a hollow piston with an internal low pressure chamber, a head on said piston reciprocal within said high pressure chamber and comprising a central passage affording communication between said chambers, a metering pin mounted within said cylinder and adapted for reciprocation within said passage to define a restricted orifice therewith, passage means through the head adapted to afford communication between said chambers independently of said orifice, and inertia valve means carried by said head and including a valve member adapted in the closed position thereof to close said passage means, and spring means reacting against said head and against a downwardly facing surface on said member for urging the latter to the closed position thereof, said spring means being adapted to yield and thereby permit said member to assume its open position as said strut is subjected to a sudden upward movement of predetermined magnitude, said valve member having balanced pressure areas acted on at all times by the pressure in said high pressure chamber whereby, opening and closing of said valve member is entirely independent of the pressure in the high pressure chamber.

20. In an oleo strut, a bottom follower in the form of a cylinder comprising a high pressure chamber, a metering pin carried by said cylinder within said chamber, a top follower in the form of a piston with a head reciprocal in said cylinder and defining the top of said chamber and the bottom of a low pressure chamber, a passage through said head affording fluid communication between said chambers, said pin being reciprocal within said opening and defining therewith a metering orifice, a by-pass passage through said piston above said orifice, an inertia valve member engageable with said piston along a surface thereof extending substantially parallel with the axis of said strut to close said by-pass passage, and spring means for urging said member to its closed position, said spring means being adapted to yield, thereby accommodating movement of said member to its open position as said strut is subjected to sudden upward movement.

FRED E. BACHMAN.

REFERENCES CITED

The following references are of record in the file of this patent:

UNITED STATES PATENTS

| Number | Name | Date |
| --- | --- | --- |
| 1,268,452 | Goodyear | June 4, 1918 |
| 1,886,712 | Messier | Nov. 8, 1932 |
| 2,146,089 | Onions | Feb. 7, 1939 |
| 2,156,117 | Johnson | Apr. 25, 1939 |
| 2,186,011 | DePort | Jan. 9, 1940 |
| 2,222,845 | Johnson | Nov. 26, 1940 |
| 2,224,306 | Krueger | Dec. 10, 1940 |
| 2,227,261 | Johnson | Dec. 31, 1940 |
| 2,275,462 | Parilla | Mar. 10, 1942 |
| 2,329,803 | Whistler | Sept. 21, 1943 |